United States Patent
Marrow et al.

(10) Patent No.: US 7,872,978 B1
(45) Date of Patent: Jan. 18, 2011

(54) OBTAINING PARAMETERS FOR MINIMIZING AN ERROR EVENT PROBABILITY

(75) Inventors: Marcus Marrow, Santa Clara, CA (US); Jason Bellorado, Santa Clara, CA (US)

(73) Assignee: Link_A_Media Devices Corporation, Santa Clara, CA (US)

( * ) Notice: Subject to any disclaimer, the term of this patent is extended or adjusted under 35 U.S.C. 154(b) by 320 days.

(21) Appl. No.: 12/148,503

(22) Filed: Apr. 18, 2008

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ..................... 370/242
(58) Field of Classification Search ............... None
See application file for complete search history.

(56) References Cited

U.S. PATENT DOCUMENTS

| | | | |
|---|---|---|---|
| 5,031,124 A * | 7/1991 | Bosinoff et al. ............ 702/186 |
| 5,697,084 A * | 12/1997 | Tingley ................... 455/276.1 |
| 6,208,684 B1 * | 3/2001 | Yellin et al. ................ 375/144 |
| 6,272,108 B1 * | 8/2001 | Chapman .................... 370/226 |
| 6,370,191 B1 * | 4/2002 | Mahant-Shetti et al. ..... 375/233 |
| 6,668,014 B1 * | 12/2003 | Endres et al. ............... 375/232 |
| 6,870,901 B1 * | 3/2005 | Gudmundsson et al. ....... 379/22 |
| 7,400,694 B1 * | 7/2008 | Sonntag et al. ............ 375/350 |
| 7,450,518 B2 * | 11/2008 | Yousef ...................... 370/242 |
| 7,450,924 B1 * | 11/2008 | Mostafa et al. ............. 455/306 |
| 7,592,956 B2 * | 9/2009 | McPherson et al. ......... 342/458 |
| 2003/0058494 A1 * | 3/2003 | Roberts et al. ............. 359/115 |
| 2006/0029166 A1 * | 2/2006 | Kang ........................ 375/341 |
| 2006/0072682 A1 * | 4/2006 | Kent et al. .................. 375/267 |
| 2008/0123786 A1 * | 5/2008 | Wongwirawat et al. ..... 375/346 |
| 2008/0253438 A1 * | 10/2008 | Riani et al. ................. 375/232 |
| 2009/0201208 A1 * | 8/2009 | McPherson et al. ......... 342/458 |

OTHER PUBLICATIONS

Haykin et al, Introduction to Analog & Digital Communications, 2007, John Wiley & Sons Inc., Second Edition, p. 306.*
J. Riani et al., Near Minimum Bit-Error Rate Equalizer Adaptation for PRML Systems, IEEE GLOBECOM 2005, pp. 2123-2128.

* cited by examiner

*Primary Examiner*—Ayaz R Sheikh
*Assistant Examiner*—Peter Chau
(74) *Attorney, Agent, or Firm*—Van Pelt, Yi & James LLP

(57) ABSTRACT

A set of one or more receiver parameters is adjusted. It is determined whether to adjust the set of receiver parameters. In the event it is determined to adjust the set of receiver parameters, a new set of values is generated for the set of receiver parameters using a cost function (where the cost function does not assume a noise signal in a receive signal to have a particular statistical distribution) and the set of receiver parameters is changed to have the new set of values.

22 Claims, 7 Drawing Sheets

OBTAINING PARAMETERS FOR MINIMIZING AN ERROR EVENT PROBABILITY

BACKGROUND OF THE INVENTION

The performance of some systems is dictated by the parameter values selected for the components of that system. For example, in the case of a read channel (which accesses data stored in a hard disk system and performs error correction on the read data), some example parameters include the x taps of a Finite Impulse Response (FIR) filter, the y taps of a target, the z branch levels of a Viterbi decoder, etc. Typically, these parameters are programmed into a newly manufactured system at a manufacturing or test facility before being sold. For example, each newly manufactured system is tested over multiple iterations and appropriate values for system parameters are selected and programmed for that device, sometimes with different zones or regions of the disk having different parameters.

FIG. 1 shows an example of a full (numerical) gradient descent technique to adjust system parameters. Using this technique, a hard disk or other system being programmed starts with an initial set of parameters, such as system parameters 0 (100). Some finite number of variations of the initial parameters values is tested. For example, system parameters 1 (101) may increase or decrease one subset of parameters, system parameters 2 (102) another subset, etc. In the example shown here, this means programming the system with and testing system parameters 1-6 (101-106). The variation with the best metric is selected as the next set of parameters to use and the process repeats. In this example, system parameters 3 (103) had the best performance and is selected. Conceptually, the initial set of parameters can be thought of as the center of a wheel and each of the variants is a "spoke" of the wheel. The best "spoke" or variation is selected to be the next center and the process repeats. For example, after selecting system parameters 3 (103) a new iteration is performed by testing system parameters 7-12 (107-112). In addition to being slow and/or computationally intensive, full gradient descent does not always result in the best Bit Error Rate (BER).

Another technique is described in the paper "Near minimum-BER all adaptive partial response equalization for high density recording systems" by J. Riani, A. Immink, S. Beneden, and J. Bergmans (IEEE global communications conference (GLOBECOM), November 2006). In that paper, Riani et al. present a cost function (as well as its associated derivatives) for a bit error rate of a system. This is faster than the full gradient technique shown in FIG. 1 (e.g., can go directly from system parameters 0 to system parameters 3 in FIG. 1 without trying out system parameters 1-2 and 4-6). The formulation of this cost function, however, assumes a Gaussian noise source. This assumption is not valid in some real-life systems and performs poorly (at least empirically) when non-Gaussian noise is present. It would be desirable to develop new techniques for selecting or otherwise determining system parameters that are less computationally intensive and/or have more general or broad application (e.g., not limited to Gaussian noise) than some other techniques.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
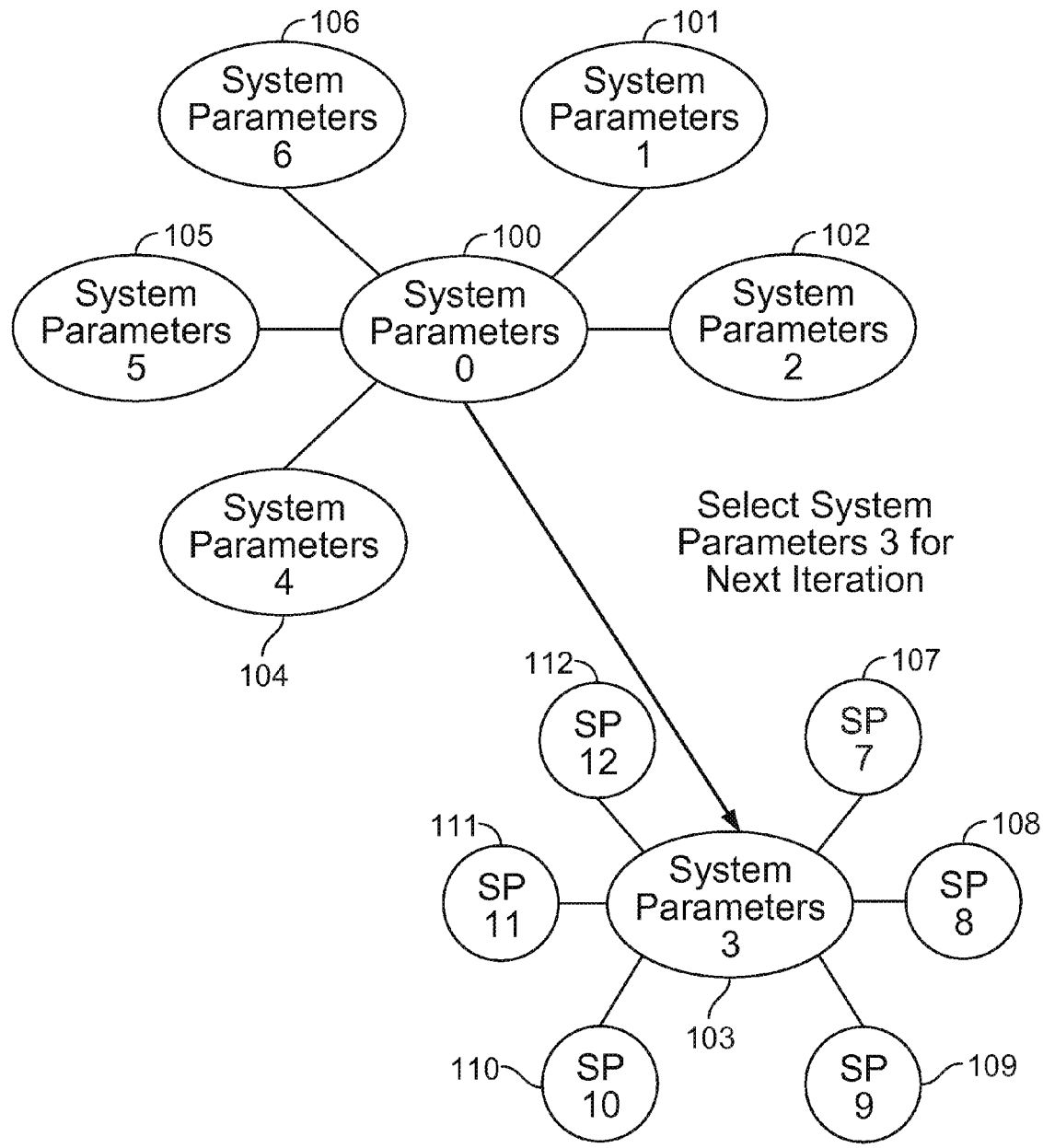
FIG. 1 shows an example of a full (numerical) gradient descent technique to adjust system parameters.
Figure 2:
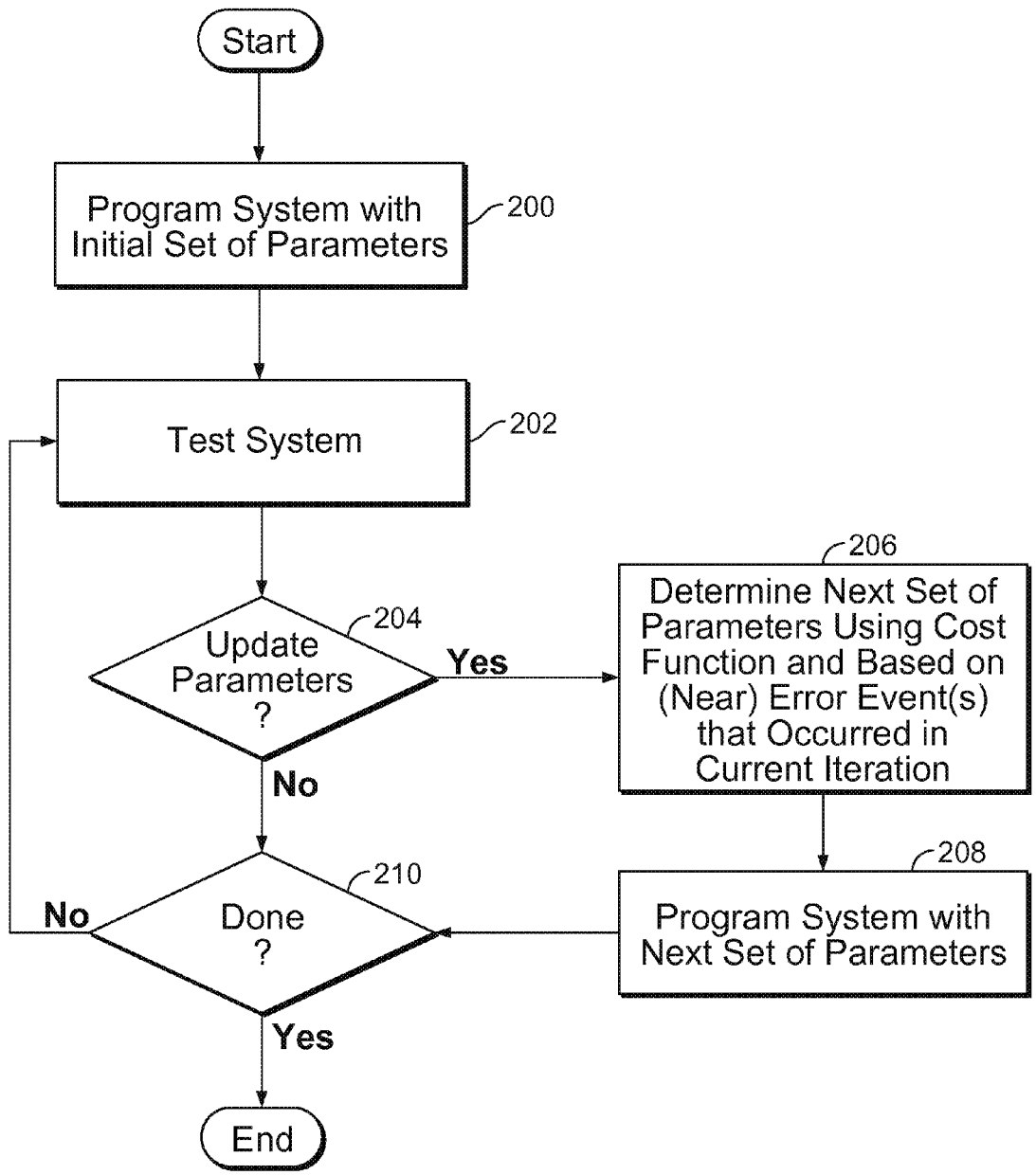
FIG. 2 is a flowchart illustrating an embodiment of a process for selecting system parameters using a cost function.

FIG. 2 is a flowchart illustrating an embodiment of a process for selecting system parameters using a cost function. A cost function is also referred to as an objective function. In the example shown, the process is performed by some test or manufacturing equipment, for example at the factory or some post manufacturing test facility. In some embodiments, the system being processed is a hard disk system and the system parameters being determined and programmed are associated with the read channel of a hard disk system.

At 200, a system is programmed with initial set of parameters. In one example, the initial set of parameters includes typical or median parameter values. The system is tested at 202. For example, (known) input data may be passed to the system. At 204, it is determined whether to update the parameters. In some embodiments, parameters are updated only if an error event is detected. In some embodiments, parameters are updated if either an error event occurs or a near error event occurs. Some embodiments for determining when a near error event and/or an error event has occurred are described in further detail below.

In a near error event, the correct or proper decision is made (e.g., the detector output matches the transmitted data) but the reliability was marginal. In other words, some additional noise may cause a near error event to become an (actual) error event. In some embodiments, some range or margin is used to define what comprises a near error event.

If it is determined at 204 to update parameters, a next set of parameters is determined using a cost function and based on (near) error event(s) that occurred in a current iteration at 206. In some embodiments, only some of the parameters have new values (i.e., values for at least some of the parameters remain the same). At 208, a system is programmed with a next set of parameters. After programming a next set of parameters at 208 or if it is determined at 204 to not update parameters, it is determined whether a process is done at 210. In some embodiments, a process ends if a maximum number of iterations is reached. In some embodiments, a process ends if a desired bit error rate or other desired value for a metric is achieved. If the process is not done, the system is tested again at 202. Some examples of metrics include minimizing the mean-squared error between an equalized and expected waveform, minimizing the frame (sector) error rate of the system, etc.

Some embodiments of a cost function used at step 206 is discussed in further detail below. A digital receiver produces a decision vector $\hat{b}=(\hat{b}_1, \hat{b}_2, \ldots, \hat{b}_N)$ (in general, the "hat" notation is utilized to denote a detected or decoded sequence (i.e., denotes a guess at the transmission)) from the received sample vector $x=(x_1, x_2, \ldots, x_N)$ by maximizing (or minimizing) a given figure-of-merit $m(b, x)$ over all possible transmitted or written bit sequences b. That is, $$\hat{b} = \mathrm{argmax}_b m(b, x) \quad (1)$$

Since the objective considered here is to minimize the detected bit error rate, the objective (i.e., cost) function being maximized (or minimized) is the a-posteriori probability of the written or transmitted data vector when conditioned on the received signal, i.e., $$\hat{b}_{minBER} = \mathrm{argmax}_b Pr(b \mid x) \quad (2)$$

For a channel with inter-symbol interference (ISI), correlated noise, and/or data-dependant noise, computing the a-posteriori probability (APP) for each of the possible transmitted bit sequences is computationally intractable. To get around this, in some embodiments received samples are equalized to a target waveform (having a shorter ISI length than the received waveform) which is subsequently applied to a sequence detector (SD). In some embodiments, a Viterbi detector is used as the sequence detector.

To obtain a cost function which can be used to generate or otherwise select system parameters, an existing figure-of-merit $m(b, x)$ is adapted to more closely resemble the a-posteriori probability function, thus reducing the overall (bit)

error rate of a digital receiver. For this, the probability of the occurrence of an error event is expressed as.

$$Pr(\text{error event}) = Pr(b^* \text{ transmitted}, (b^* \oplus e) \text{ detected}) \quad (3)$$

where e is a (nonzero) binary vector that defines the error event. In this scenario, the detected vector is selected as that which minimizes the metric $m(b, x)$, and therefore, $$Pr(\text{error event}) = Pr(m(b^* \oplus e, x) < m(b^*, x)) \quad (4)$$

(In other embodiments with different metrics, a vector is selected which maximizes a metric and the embodiments described herein are modified accordingly.) Equation (4) is rewritten as an expectation over all transmitted (written) and received (read) vector pairs $(b^*, x)$ of the indicator function $I(x)$ of the occurrence of an error event, $$Pr(\text{error event}) = E_{(b^*, x)}[I(m(b^* \oplus e, x) < m(b^*, x))] \quad (5)$$

where $I(x)=0$ if x is false and $I(x)=1$ if x is true. Equivalently, this can be written in terms of the unit step-function $U(x)$ (where $U(x)=0$ for $x<0$ and $U(x)=1$ for $x \geq 0$) as:

$$Pr(\text{error event}) = E_{(b^*, x)}[U(m(b^* \oplus e, x) - m(b^*, x))] \quad (6)$$

In this example, the approach taken to minimize Equation (6) is stochastic gradient descent. Using this technique, the gradient, at each time step, is formed as the derivative of the argument of the expectation function with respect to the vector of parameters (p) being adapted, i.e., $$\nabla_p = \frac{\partial}{\partial p}[U(m(b^* \oplus e, x) - m(b^*, x))] \quad (7)$$

$$= \delta(m(b^* \oplus e, x) - m(b^*, x)) \cdot \frac{\partial}{\partial p}(m(b^* \oplus e, x) - m(b^*, x)) \quad (8)$$

Although the gradient given by Equation (8) does act to minimize error event occurrence probability, its usefulness is limited by the fact that updates are only conducted when $m(b^* \oplus e, x) = m(b^*, x)$. For a continuous-valued noise process, this event occurs with zero probability. To relax this constraint, the unit step function, $U(x)$, in Equation (7) is replaced by the function $\tilde{U}(x)$ which for a positive real-number $\alpha$ is defined by, $$\tilde{U}(x) \begin{cases} -\alpha, & x < -\alpha \\ x, & |x| < \alpha \\ \alpha, & x > \alpha \end{cases} \quad (9)$$

yielding the derivative, $$\tilde{U}'(x) \begin{cases} 1, & |x| < \alpha \\ 0, & \text{otherwise} \end{cases} \quad (10)$$

Figure 3A:
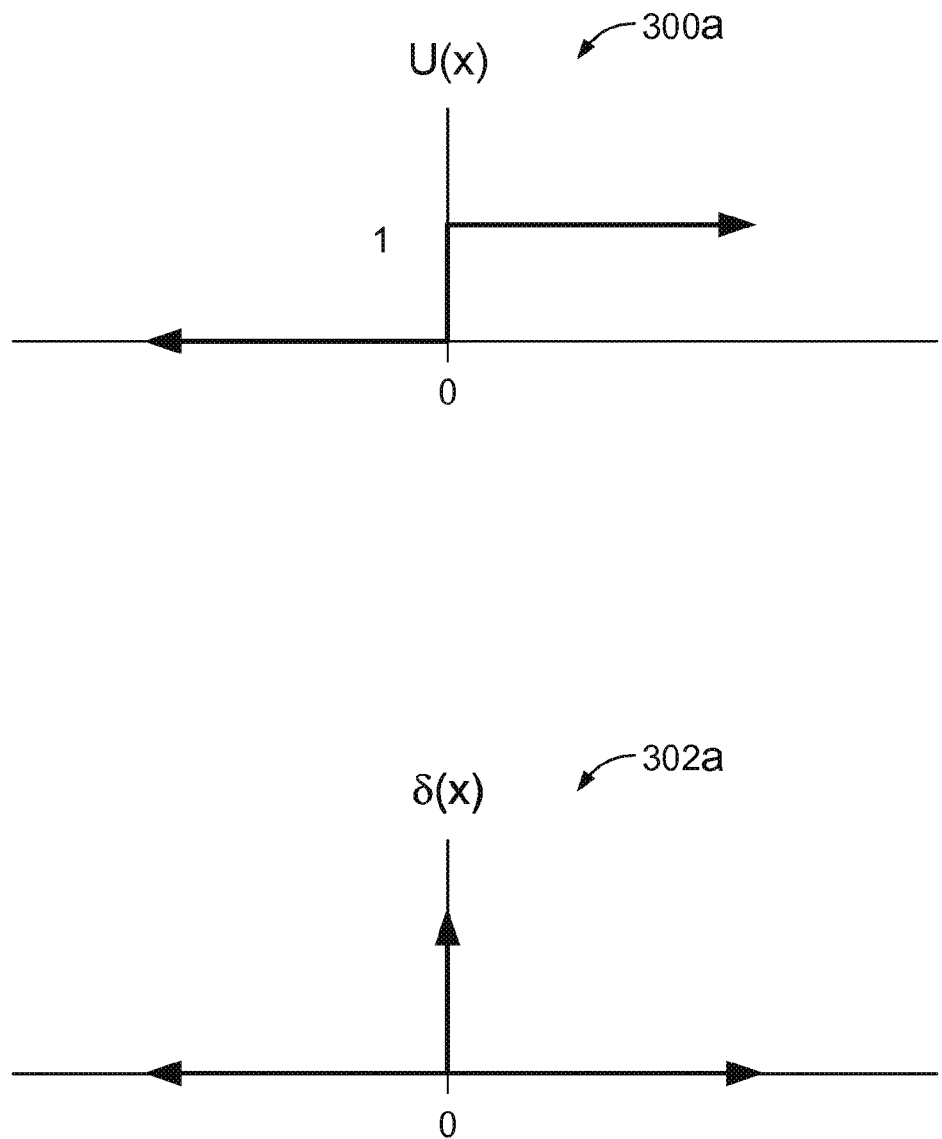
FIG. 3A is a diagram showing examples of a unit step function, U(x), and its derivative the Dirac delta function, $\delta(x)$.
Figure 3B:
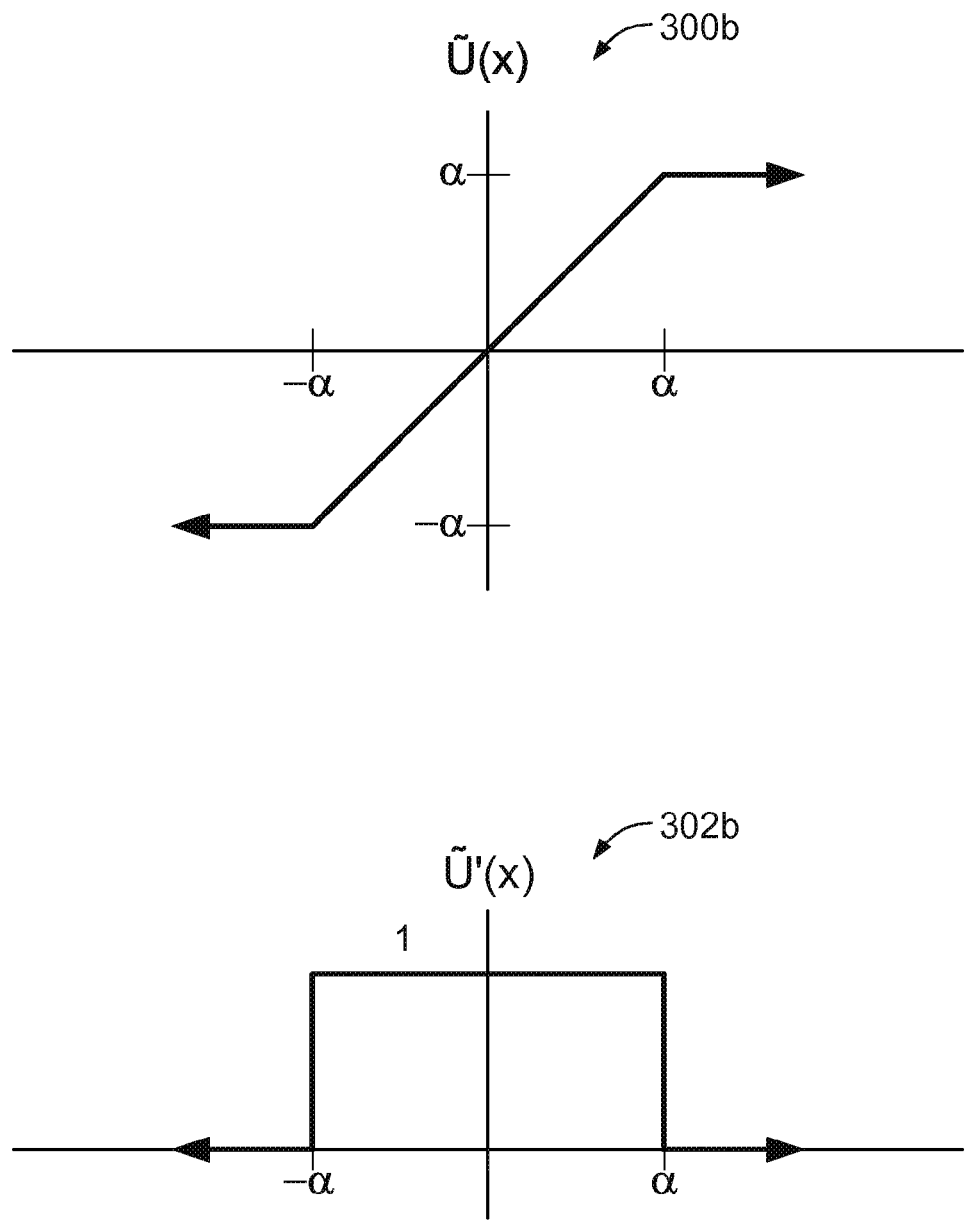
FIG. 3B is a diagram showing examples of the function, $\tilde{U}(x)$, and its derivative, $\tilde{U}'(x)$.

FIG. 3A is a diagram showing examples of a unit step function, $U(x)$, and its derivative the Dirac delta function, $\delta(x)$. Graph 300a shows $U(x)$ and graph 302a shows $\delta(x)$; these functions are used in Equations (6)-(8). FIG. 3B is a diagram showing examples of the function, $\tilde{U}(x)$, and its derivative, $\tilde{U}(x)$. Graph 300b shows $\tilde{U}(x)$ and graph 302b shows $\tilde{U}'(x)$.

By substituting $\tilde{U}(x)$ for $U(x)$ in Equation (7), the gradient function in Equation (8) becomes, $$\tilde{\nabla}_p = \tilde{U}'(m(b^* \oplus e, x) - m(b^* \oplus e, x)) \cdot \delta/\delta p(m(b^* \oplus e, x) - m(b^*, x)) \quad (11)$$

By using $\tilde{U}(x)$ instead of $U(x)$, some non error events (such as near error events) where $m(b^* \oplus e, x) > m(b^*, x)$ are taken into consideration in addition to error events where $m(b^* \oplus e, x) < m(b^*, x)$. That is, a non error event in addition to an (actual) error event will cause a new parameter to be calculated.

Using Equation (11), the parameter vector, p, is updated according to the gradient update equation, $$p = p - \tilde{\nabla}_p \cdot \eta \quad (12)$$

where η (step-size) is a parameter that controls the rate of convergence of the optimization. In some embodiments, different step-sizes (η) are used for each set of parameters. In some embodiments, the step-size depends upon the system. For example, a 7-bit ADC converter with samples in the range of −64 thru 63 would have step sizes that are half the step size for a 6-bit ADC with samples in the range of −32 thru 31. It, thus, only remains to provide the derivative function given in Equation (11), which is dependent upon the embodiment of the invention, to determine the optimization equations for that particular system. Since further manipulation of Equation (11) is implementation dependent, one embodiment (which includes a Viterbi detector for maximum-likelihood sequence detection) is described below to illustrate this technique in more detail. In other embodiments, some other system configuration is used and the equations change accordingly.

Figure 4:
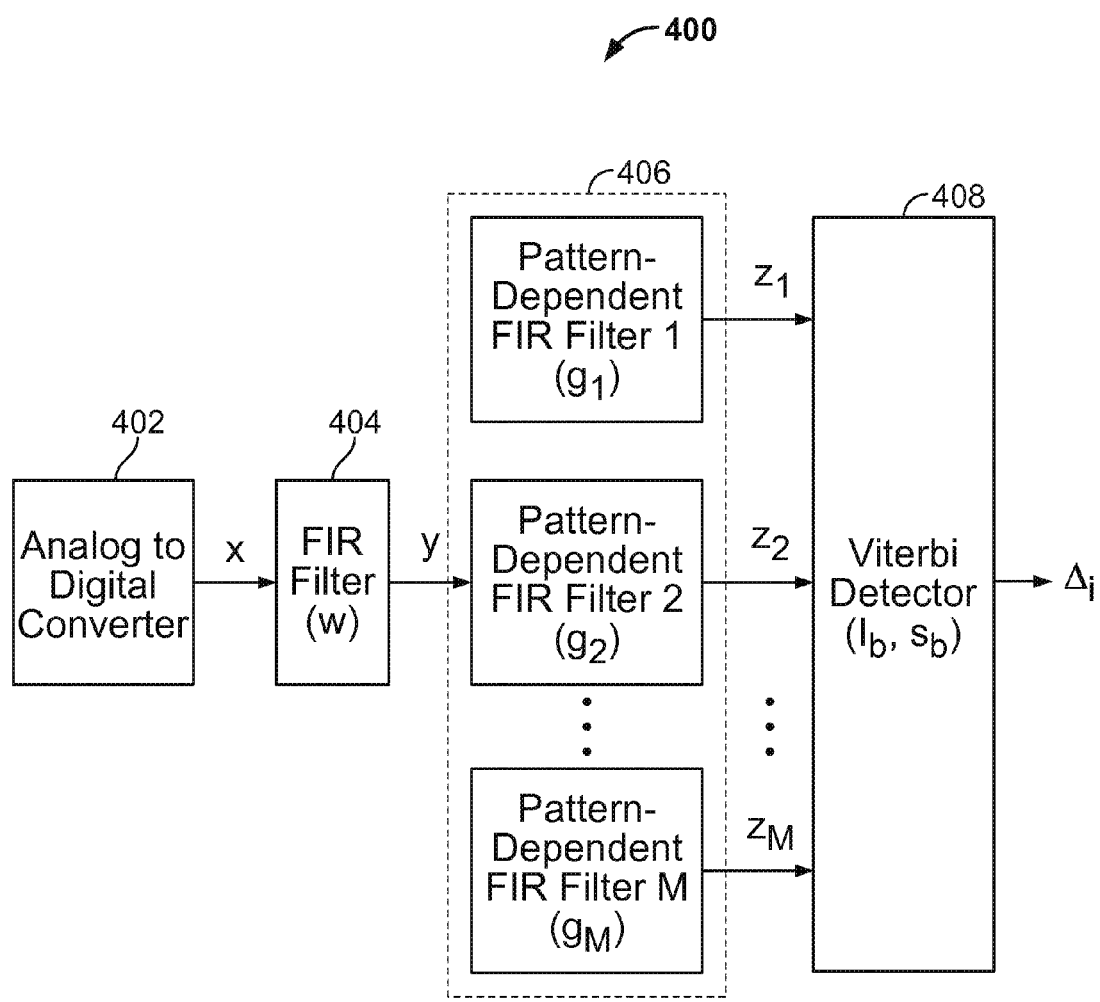
FIG. 4 is a system diagram showing an embodiment of a receiver for which a cost function to generate parameters for the receiver components is obtained.

FIG. 4 is a system diagram showing an embodiment of a receiver for which a cost function to generate parameters for the receiver components is obtained. In the example shown, receiver 400 includes analog to digital converter (ADC) 402 which produces the sampled data vector $x=(x_1, x_2, \ldots, x_N)$ from a continuous-time, continuous-amplitude, waveform x(t). The sampled data vector is passed to a finite impulse response (FIR) filter 404 having a parameter vector $w=(w_1, w_2, \ldots w_L)$. FIR filter 404 is also referred to as an equalizer. FIR filter 404 produces an equalized waveform $y=(y_1, y_2, \ldots, y_N)$ which is passed to a parallel bank of M pattern dependent FIR filters 406 to produce M parallel data streams which are input to Viterbi Detector 408. Each of the M FIR filters 406 has a corresponding parameter vector $g_1$-$g_M$, respectively. Some other techniques to determine system parameters (e.g., which use a cost function or otherwise) do not necessarily optimize parameters for pattern dependent filters, such as the M parallel FIR filters 406, for optimal BER. Some other techniques may, for example, attempt to "whiten" (i.e., de-correlate the input noise source).

Viterbi Detector 408 has the parameters $l_b$ and $s_b$ and selects a particular decoded bit sequence according to:

$$\hat{b} = \underset{b}{\mathrm{argmax}} \sum_{i=1}^{N} s_{(b,i)} \cdot (z_{(b,i)} - l_{(b,i)})^2 \quad (13)$$

where $\hat{b}=(\hat{b}, \hat{b}_2, \ldots, \hat{b}_N)$ is a detected bit sequence and $l_b(l_{(b,1)}, l_{(b,2)}, \ldots, l_{(b,N)})$ is a sequence of expected channel outputs corresponding to a particular transmitted or written bit sequence b. The multiplicative scale factor $s_{(b,i)}$, the expected channel output $l_{(b,i)}$, and the specific pattern dependent filter output utilized $z_{(b,i)}$ are functions of the bit sequence b under consideration and therefore have a subscript to indicate the corresponding bit sequence. In the event that a bit-error (or multiple bit-errors) has occurred (i.e., an error event), it is true that for some $\hat{b} \neq b^*$:

$$\mathcal{J}(b^*, \hat{b}, x, p) = \\ \sum_{i=1}^{N} s_{(\hat{b},i)} \cdot (z_{(\hat{b},i)} - l_{(\hat{b},i)})^2 - \sum_{i=1}^{N} s_{(b^*,i)} \cdot (z_{(b^*,i)} - l_{(b^*,i)})^2 < 0 \quad (14)$$

It is desirable here to increase the value of Equation (14), e.g., by incrementally adapting the vector of parameters p being considered. In various embodiments, the receiver parameters being optimized or selected include: the taps of equalizer 404 (w), the values of the expected (noiseless) channel outputs ($l_b$) utilized by Viterbi Detector 408, the values of the multiplicative scale factors ($s_b$) utilized by Viterbi Detector 408, and/or the taps of each pattern dependent filter $g_b = (g_{(b,1)}, g_{(b,2)}, \ldots, g_{(b,P)})$ for filters 406 where P is the number of taps for each filter and M is the number of filters.

In general, $\hat{b}$ and $b^*$ are equivalent in most locations provided the bit error rate of the system is at a reasonable level. Since the values of $l_{(b,i)}$, $s_{(b,i)}$, and $z_{(b,i)}$ are only influenced by the bits temporally adjacent to time index i (e.g., bits $b_{(i+j)}$ for small |j|), the difference of the two summations in Equation (14) will be zero for most time indices i. The time indices in which this difference is non-zero will surround time indices in which $\hat{b}$ and $b^*$ differ. A series of consecutive time indices during which the difference of these summands is non-zero will be, hereafter, referred to as an error event and denoted by a set of indices $\mathcal{O}$. Each error event is considered independently and, thus, the updates associated with a single error event are discussed in the following.

The objective function expressed over the duration of an error event is given by $$\mathcal{J}(b^*, \hat{b}, x, p) = \sum_{i \in C} \left[ s_{(\hat{b},i)} \cdot (z_{(\hat{b},i)} - l_{(\hat{b},i)})^2 - s_{(b^*,i)} \cdot (z_{(b^*,i)} - l_{(b^*,i)})^2 \right] \quad (15)$$

To construct the gradient vector, the derivative of Equation (15) is taken with respect to each element of the parameter vector. Due to the linearity of the derivative function, each time index in $\mathcal{O}$ may be considered separately. For a given time index i ∈ $\mathcal{O}$, the derivatives for the multiplicative scale factors (e.g., $s_b$ of Viterbi Detector 408 in FIG. 4) are given by $$\frac{\partial \mathcal{J}(b^*, \hat{b}, x, p)}{s_{(\hat{b},i)}} = (z_{(\hat{b},i)} - l_{(\hat{b},i)})^2 \quad (16)$$

$$\frac{\partial \mathcal{J}(b^*, \hat{b}, x, p)}{s_{(b^*,i)}} = -(z_{(b^*,i)} - l_{(b^*,i)})^2 \quad (17)$$

$$\frac{\partial \mathcal{J}(b^*, \hat{b}, x, p)}{l_{(\hat{b},i)}} = -2 \cdot s_{(\hat{b},i)} \cdot (z_{(\hat{b},i)} - l_{(\hat{b},i)}) \quad (18)$$

$$\frac{\partial \mathcal{J}(b^*, \hat{b}, x, p)}{l_{(b^*,i)}} = 2 \cdot s_{(b^*,i)} \cdot (z_{(b^*,i)} - l_{(b^*,i)}) \quad (19)$$

To obtain the derivative for the other considered parameters, the value of z(b,i) is first written as a convolution of the equalized waveform y and the appropriate pattern dependent filter $g_b$ as $$z_{(b^*,i)} = \sum_{j=1}^{P} g_{(b^*,i)} \cdot y_{(i+n_g-j)} \quad (20)$$

where $n_g$ is an offset that specifies the equalized samples utilized in the convolution to produce $z_{(b)}$ at time index i. In some embodiments, the value of $n_g$ depends on the delay associated with each filter and depends upon the particular system. In one example, if all filters are causal (i.e., the main tap of the filter is the first tap) then the delays would be zero. From Equation (14), the derivatives with respect to the jth-tap of the pattern dependent filters are given by, $$\frac{\partial \mathcal{F}(b^*, \hat{b}, x, p)}{g_{(\hat{b},j)}} = 2 \cdot s_{(\hat{b},i)} \cdot (z_{(\hat{b},i)} - l_{(\hat{b},i)}) \cdot y_{(i+n_g-j)} \quad (21)$$

$$\frac{\partial \mathcal{F}(b^*, \hat{b}, x, p)}{g_{(b^*,j)}} = -2 \cdot s_{(b^*,i)} \cdot (z_{(b^*,i)} - l_{(b^*,i)}) \cdot y_{(i+n_g-j)} \quad (22)$$

To obtain an expression for the derivative with respect to the taps of the FIR equalizer w, the equalized waveform is expressed as the convolution of the sampled data vector x and the equalizer w:

$$y_i = \sum_{j=1}^{L} w_j \cdot x_{(i+n_w-j)} \quad (23)$$

where $n_w$ is an integer offset which specifies the received samples utilized in the convolution to produce the equalized waveform at time index i. Using Equations (20) and (23), an expression for $z_{(b,i)}$ in terms of the equalizer is obtained as, $$z_{(b,i)} = \sum_{j=1}^{P} \sum_{k=1}^{L} g_{(b,j)} \cdot w_k \cdot x_{(i+n_g-k+n_w-j)} \quad (24)$$

From Equations (15) and (24), the derivative of the objective function with respect to the kth tap of the equalizer is computed as, $$\frac{\partial \mathcal{F}(b^*, \hat{b}, x, p)}{w_k} = 2 \cdot s_{(\hat{b},i)} \cdot (z_{(\hat{b},i)} - l_{(\hat{b},i)}) \cdot \frac{\partial}{w_k} z_{(\hat{b},i)} - 2 \cdot s_{(b^*,i)} \cdot \quad (25)$$

$$= (z_{(b^*,i)} - l_{(b^*,i)}) \cdot \frac{\partial}{w_k} z_{(b^*,i)} 2 \cdot s_{(\hat{b},i)} \cdot \quad (26)$$

$$(z_{(\hat{b},i)} - l_{(\hat{b},i)}) \cdot \sum_{j=1}^{P} g_{(\hat{b},j)} \cdot x_{(i-j-k+n_g+n_w)} -$$

$$2 \cdot s_{(b^*,i)} \cdot (z_{(b^*,i)} - l_{(b^*,i)}) \cdot \sum_{j=1}^{P} g_{(b^*,i)} \cdot$$

$$x_{(i-j-k+n_g+n_w)}$$

For each time index $e \in \mathcal{C}$ throughout the duration of the considered error event, the derivatives are computed for the multiplicative scale factors $s_{(b)}$ (Equations (16) and (17)), the expected channel outputs $l_{(b)}$ (Equations (18) and (19)), the taps of each of the pattern dependent filters $\{g_{(b,i)}\}$ (Equations (21) and (22)), and the taps of the equalizer $w_k$ (equation (26)). Because of the linearity of the derivative operator, the gradients for each of these parameter vectors are formed as the sum of these derivatives over the duration of the error event. (note here that every time index i within an error event produces an entire derivative vector for the equalizer. However, since only the multiplicative scale factors ($s_{(\hat{b},i)}$, $s_{(b^*,i)}$) the expected channel outputs ($l_{(\hat{b},i)}$, $l_{(b^*,i)}$), and the pattern dependent filters ($g_{(\hat{b},i)}$, $g_{(b^*,i)}$) are involved at time index i, only these values are updated for this time index). Each of the parameter vectors being considered are subsequently updated using the computed gradient vector as given by Equation (12).

In the example derivations above related to receiver 400 of FIG. 4, update of the parameter vector occurs if there is an error event. As mentioned above, in some embodiments a near error event (also) causes a parameter vector to be updated. For example, consider the case in which $\mathcal{F}(b^*,\hat{b},x,p)$ (given by Equation (14)) is less than zero, but $\mathcal{F}(b^*,\hat{b}, \tilde{x}, p)$ is greater than or equal to zero, where $\tilde{x}=x$. Although no error has occurred in this case, because x and $\tilde{x}$ are almost equal, and x was observed, it is statistically likely that $\tilde{x}$ could have also been observed. The following figure shows one embodiment that takes near error events into consideration when updating parameters. An example metric for determining whether a near error event has occurred is also described below.

Figure 5:
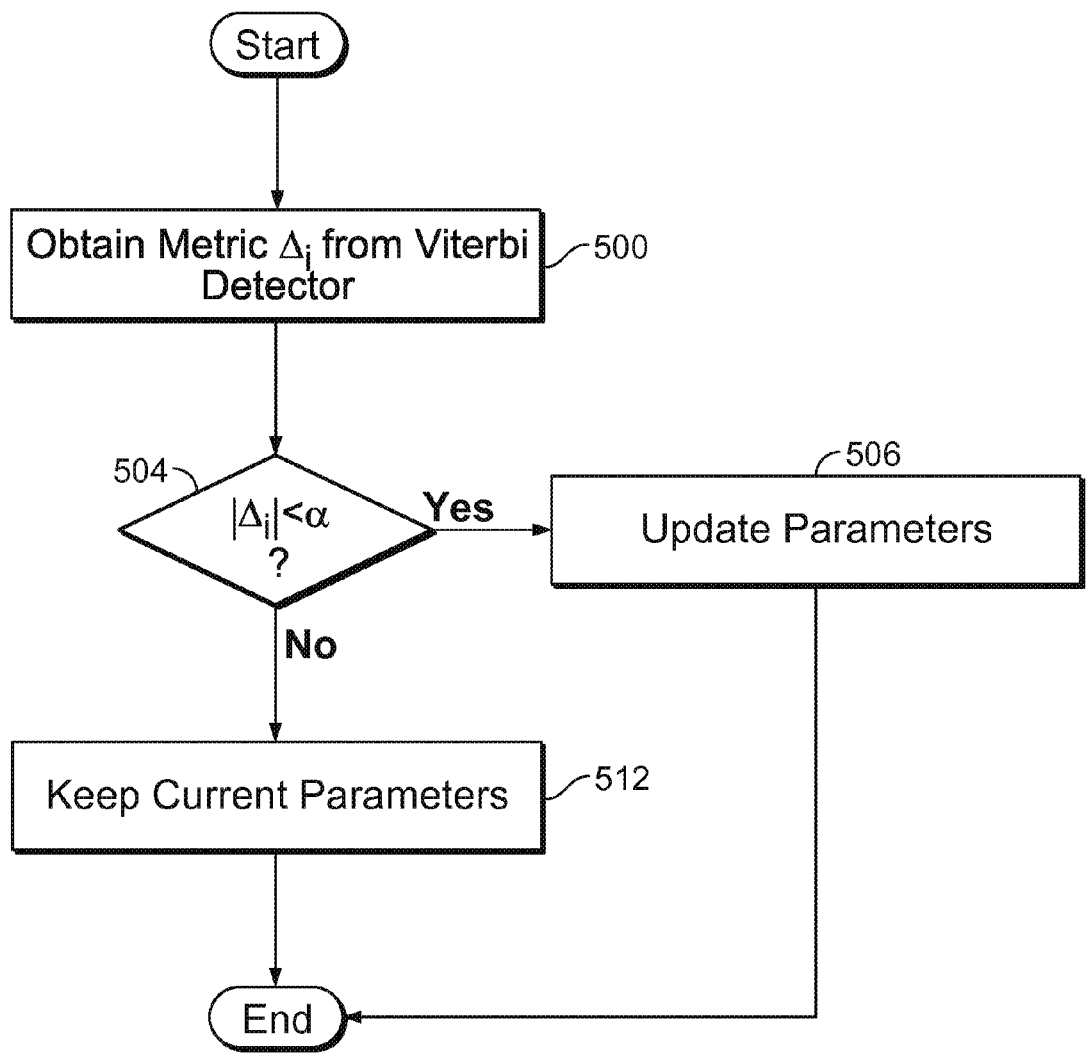
FIG. 5 is a flowchart illustrating an embodiment of process for updating parameters in the event there is a near error event or an error event with a small magnitude.

FIG. 5 is a flowchart illustrating an embodiment of process for updating parameters in the event there is a near error event or an error event with a small magnitude. In some embodiments, the example process is used at step 204 in FIG. 2 to determine whether to update receiver parameters. FIG. 5 is best understood in light of FIG. 4. Some other system configurations correspond to other metrics, thresholds, etc.

At 500, the metric $\Delta_i$ is obtained from a Viterbi Detector. In FIG. 4, the Add-Compare-Select (ACS) operation performed by the Viterbi-Detector precisely computes information that shows how close an error event is to occurring. At each time index i, the Viterbi Detector computes and compares the metric given as Equation (14) for time indices 1, 2, . . . , i for two distinct bit sequences. For the Viterbi Detector state corresponding to the transmitted or written bit sequence b*, a comparison is made between the metric for b*, $$m_i(b^*) = \sum_{j=1}^{i} s_{(b^*,j)} \cdot (z_{(b^*,j)} - l_{(b^*,j)})^2 \quad (27)$$

and the metric for a candidate bit sequence $\hat{b}$, $$m_i(\hat{b}) = \sum_{j=1}^{i} s_{(\hat{b},j)} \cdot (z_{(\hat{b},j)} - l_{(\hat{b},j)})^2 \quad (28)$$

producing the figure-of-merit, $$\Delta_i = m_i(\hat{b}) - m_i(b^*) \quad (29)$$

which is output by the Viterbi Detector, as shown in FIG. 4.

In the event that $m_i(b^*)$ exceeds $m_i(\hat{b})$ (i.e., $\Delta_i$ is negative) an error event occurs. If $m_i(\hat{b}) > m_i(b^*)$ and $m_i(\hat{b}) - m_i(b^*) \approx 0$, an error event has almost occurred. In this example, the occurrence of a near error event is specified by $$0 < [m_i(\hat{b}) - m_i(b^*)] < \alpha \tag{30}$$

In some embodiments, $\alpha \approx 0.1$. In this embodiment, both near error events and small magnitude error events are taken into account during the optimization process by determining at 504 whether $|\Delta_i| < \alpha$. If so, the parameters are updated at 506. For example, a parameter vector p is updated using a received vector x, as indicated by the update equations (some examples of which are described above). Otherwise, the current parameters are kept at 612.

Embodiments that update parameters if a near error event occurs (e.g., in addition to an actual error event) may be attractive for a number of reasons. In some cases, the rate of convergence of a parameter selection optimization process is greatly increased by this inclusion. This is particularly true under high signal-to-noise ratio conditions where a large amount of data would be required in order to observe a sufficient number of bit errors to allow convergence of the optimization process. The data set size and/or convergence time may be greatly reduced if near error events are also included.

Figure 6:
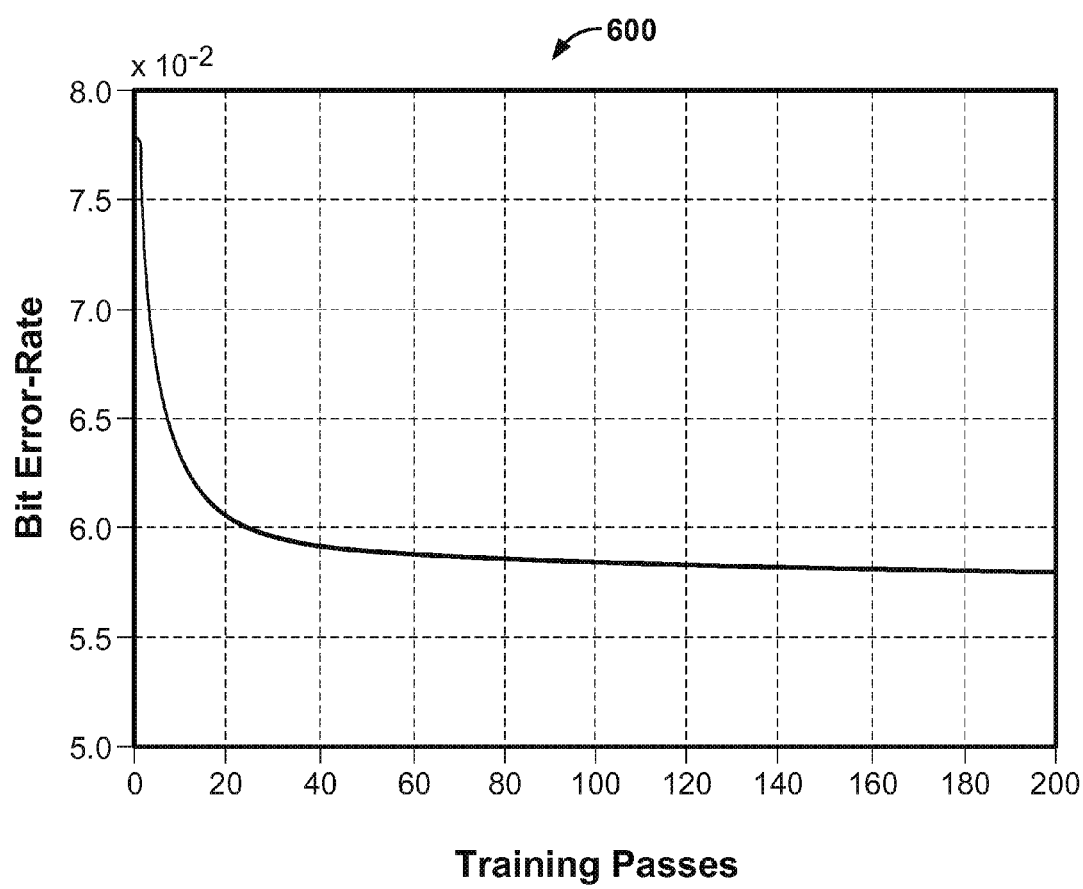
FIG. 6 is a chart showing bit error rate as a function of iterations.

FIG. 6 is a chart showing bit error rate as a function of iterations. In the example shown, graph 600 corresponds to a hard drive consisting of 2000 sectors of 4640 bits each. Each data point in graph 600 corresponds to an entire 2000 sector data set (referred to as a training pass). In this example, parameters are adjusted over multiple iterations so that the probability of the most likely error events can be maximally reduced, thus maximally reducing the overall system error event rate.

Graph 600 shows one advantage of the techniques describe herein: monotonic reduction in a bit error rate. As a result, performing more iterations is guaranteed to improve performance. Some other techniques do not monotonically reduce BER and adjusting parameters further (i.e., performing more iterations) at some points may cause an error rate to increase, which is not desirable. The magnitude of this reduction over a traditional system designed under the minimum mean-squared error criterion depends upon the characteristics of the noise process (e.g., power, correlation, etc.). Bit error rate reductions have been observed to range from 10% to several orders of magnitude.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for adjusting a set of one or more receiver parameters, comprising:
    using a processor to determine whether to adjust the set of one or more receiver parameters; and
    in an event it is determined to adjust the set of one or more receiver parameters:
        using the processor to generate a new set of values for the set of one or more receiver parameters using a cost function, wherein the cost function does not assume a noise signal in a receive signal to have a particular statistical distribution; and
        changing the set of one or more receiver parameters to have the new set of values, wherein:
            the set of one or more receiver parameters includes a set of one or more parameters (s) associated with a Viterbi Detector; and
            the cost function includes at least one of: (1)

$$\frac{\partial \mathcal{J}(b^*, \hat{b}, x, p)}{s_{(\hat{b},i)}} = \left(z_{(\hat{b},i)} - l_{(\hat{b},i)}\right)^2 \tag{1}$$

or $$\frac{\partial \mathcal{J}(b^*, \hat{b}, x, p)}{s_{(b^*,i)}} = -(z_{(b^*,i)} - l_{(b^*,i)})^2. \tag{2}$$

2. The method of claim 1, wherein the set of one or more receiver parameters are associated with a read channel of a hard disk system.

3. The method of claim 1, wherein the new set of values corresponds to a subset of the set of one or more receiver parameters.

4. The method of claim 1, wherein the set of one or more receiver parameters includes at least one of the following: a parameter associated with an equalizer, a parameter associated with a pattern dependent finite impulse response (FIR) filter, a parameter associated with a Viterbi Detector.

5. The method of claim 1, wherein it is determined to adjust the set of one or more receiver parameters in an event an error event occurs.

6. The method of claim 1, wherein it is determined to adjust the set of one or more receiver parameters in an event a near error event occurs.

7. The method of claim 1 further comprising determining the cost function using a function $\tilde{U}(x)$, wherein $\tilde{U}(x) = -\alpha$ for $x < -\alpha$, $\tilde{U}(x) = x$ for $|x| < \alpha$, and $\tilde{U}(x) = \alpha$ if $x > \alpha$ where $\alpha$ is a positive and real number and x is a real number.

8. The method of claim 1 further comprising determining the cost function using a stochastic gradient descent.

9. The method of claim 1, further comprising obtaining a metric from a Viterbi Detector, wherein determining whether to adjust the set of one or more receiver parameters is based at least in part on the metric.

10. The method of claim 9, wherein the metric includes $\Delta_i$ and it is determined to adjust the set of one or more receiver parameters in an event $|\Delta_i| < \alpha$ where $\alpha$ is a positive and real number and $\Delta_i$ is a real number.

11. The method of claim 10, wherein $\alpha$ is substantially equal to 0.1.

12. A method for adjusting a set of one or more receiver parameters, comprising:
    using a processor to determine whether to adjust the set of one or more receiver parameters; and
    in an event it is determined to adjust the set of one or more receiver parameters:
        generating a new set of values for the set of one or more receiver parameters using a cost function, wherein the cost function does not assume a noise signal in a receive signal to have a particular statistical distribution; and
        changing the set of one or more receiver parameters to have the new set of values, wherein:
            the set of one or more receiver parameters includes a set of one or more parameters (1) associated with a Viterbi Detector; and
            the cost function includes at least one of: (1)

$$\frac{\partial \mathcal{J}(b^*, \hat{b}, x, p)}{l_{(\hat{b},j)}} = -2 \cdot s_{(\hat{b},i)} \cdot \left(z_{(\hat{b},i)} - l_{(\hat{b},i)}\right) \tag{1}$$

or

-continued $$\frac{\partial \mathcal{F}(b^*, \hat{b}, x, p)}{l_{(b^*,i)}} = 2 \cdot s_{(b^*,i)} \cdot (z_{(b^*,i)} - l_{(b^*,i)}). \quad (2)$$

13. A method for adjusting a set of one or more receiver parameters, comprising:
using a processor to determine whether to adjust the set of one or more receiver parameters; and
in an event it is determined to adjust the set of one or more receiver parameters:
generating a new set of values for the set of one or more receiver parameters using a cost function, wherein the cost function does not assume a noise signal in a receive signal to have a particular statistical distribution; and
changing the set of one or more receiver parameters to have the new set of values, wherein:
the set of one or more receiver parameters includes a set of one or more parameters (g), associated with a pattern dependent finite impulse response (FIR) filter; and
the cost function includes at least one of: (1)

$$\frac{\partial \mathcal{F}(b^*, \hat{b}, x, p)}{g_{(\hat{b},j)}} = 2 \cdot s_{(\hat{b},i)} \cdot \left(z_{(\hat{b},i)} - l_{(\hat{b},i)}\right) \cdot y_{(i+n_g-j)} \quad (1)$$

or $$\frac{\partial \mathcal{F}(b^*, \hat{b}, x, p)}{g_{(b^*,j)}} = -2 \cdot s_{(b^*,i)} \cdot (z_{(b^*,i)} - l_{(b^*,i)}) \cdot y_{(i+n_g-j)}. \quad (2)$$

14. A method for adjusting a set of one or more receiver parameters, comprising:
using a processor to determine whether to adjust the set of one or more receiver parameters; and
in an event it is determined to adjust the set of one or more receiver parameters:
generating a new set of values for the set of one or more receiver parameters using a cost function, wherein the cost function does not assume a noise signal in a receive signal to have a particular statistical distribution; and
changing the set of one or more receiver parameters to have the new set of values, wherein:
the set of one or more receiver parameters includes a set of one or more parameters (w) associated with an equalizer; and
the cost function includes $$\frac{\partial \mathcal{F}(b^*, \hat{b}, x, p)}{w_k} = 2 \cdot s_{(\hat{b},i)} \cdot \left(z_{(\hat{b},i)} - l_{(\hat{b},i)}\right) \cdot \sum_{j=1}^{P} g_{(\hat{b},i)} \cdot x_{(i-j-k+n_g+n_w)} -$$

$$2 \cdot s_{(b^*,i)} \cdot (z_{(b^*,i)} - l_{(b^*,i)}) \cdot \sum_{j=1}^{P} g_{(b^*,j)} x_{(i-j-k+n_g+n_w)}.$$

15. A system for adjusting a set of one or more receiver parameters, comprising:
a controller configured to determine whether to adjust the set of one or more receiver parameters;
a parameter generator configured to generate, in an event it is determined to adjust the set of one or more receiver parameters, a new set of values for the set of one or more receiver parameters using a cost function, wherein the cost function does not assume a noise signal in a receive signal to have a particular statistical distribution; and
an interface configured to change, in an event it is determined to adjust the set of one or more receiver parameters, the set of one or more receiver parameters to have the new set of values, wherein:
the set of one or more receiver parameters includes a set of one or more parameters (s) associated with a Viterbi Detector; and
the cost function includes at least one of:

$$\frac{\partial \mathcal{F}(b^*, \hat{b}, x, p)}{s_{(\hat{b},i)}} = \left(z_{(\hat{b},i)} - l_{(\hat{b},i)}\right)^2 \quad (1)$$

or $$\frac{\partial \mathcal{F}(b^*, \hat{b}, x, p)}{s_{(b^*,i)}} = -(z_{(b^*,i)} - l_{(b^*,i)})^2. \quad (2)$$

16. The system of claim 15, wherein the parameter generator is further configured to determine the cost function using a function $\tilde{U}(x)$, wherein $\tilde{U}(x)=-\alpha$ for $x<-\alpha$, $\tilde{U}(x)=x$ for $|x|<\alpha$, and $\tilde{U}(x)=\alpha$ if $x>\alpha$ where $\alpha$ is a positive and real number and x is a real number.

17. A system for adjusting a set of one or more receiver parameters, comprising:
a controller configured to determine whether to adjust the set of one or more receiver parameters;
a parameter generator configured to generate, in an event it is determined to adjust the set of one or more receiver parameters, a new set of values for the set of one or more receiver parameters using a cost function, wherein the cost function does not assume a noise signal in a receive signal to have a particular statistical distribution; and
an interface configured to change, in an event it is determined to adjust the set of one or more receiver parameters, the set of one or more receiver parameters to have the new set of values, wherein:
the set of one or more receiver parameters includes a set of one or more parameters (l) associated with a Viterbi Detector; and
the cost function includes at least one of: (1)

$$\frac{\partial \mathcal{F}(b^*, \hat{b}, x, p)}{l_{(\hat{b},j)}} = -2 \cdot s_{(\hat{b},i)} \cdot \left(z_{(\hat{b},i)} - l_{(\hat{b},i)}\right) \quad (1)$$

or $$\frac{\partial \mathcal{F}(b^*, \hat{b}, x, p)}{l_{(b^*,i)}} = 2 \cdot s_{(b^*,i)} \cdot (z_{(b^*,i)} - l_{(b^*,i)}). \quad (2)$$

18. The system of claim 17, wherein the parameter generator is further configured to determine the cost function using a function $\tilde{U}(x)$, wherein $\tilde{U}(x)=-\alpha$, for $x<-\alpha$, $\tilde{U}(x)=x$ for $|x|<\alpha$, and $\tilde{U}(x)=\alpha$ if $x>\alpha$ where $\alpha$ is a positive and real number and x is a real number.

19. A system for adjusting a set of one or more receiver parameters, comprising:
a controller configured to determine whether to adjust the set of one or more receiver parameters;
a parameter generator configured to generate, in an event it is determined to adjust the set of one or more receiver parameters, a new set of values for the set of one or more receiver parameters using a cost function, wherein the cost function does not assume a noise signal in a receive signal to have a particular statistical distribution; and an interface configured to change, in an event it is determined to adjust the set of one or more receiver parameters, the set of one or more receiver parameters to have the new set of values, wherein:

the set of one or more receiver parameters includes a set of one or more parameters (g) associated with a pattern dependent finite impulse response (FIR) filter; and the cost function includes at least one of: (1)

$$\frac{\partial \mathcal{F}(b^*, \hat{b}, x, p)}{g_{(\hat{b},j)}} = 2 \cdot s_{(\hat{b},i)} \cdot \left(z_{(\hat{b},i)} - l_{(\hat{b},i)}\right) \cdot y_{(i+n_g-j)} \quad (1)$$

or $$\frac{\partial \mathcal{F}(b^*, \hat{b}, x, p)}{g_{(b^*,i)}} = -2 \cdot s_{(b^*,i)} \cdot (z_{(b^*,i)} - l_{(b^*,i)}) \cdot y_{(i+n_g-j)}. \quad (2)$$

20. The system of claim 19, wherein the parameter generator is further configured to determine the cost function using a function $\tilde{U}(x)$, wherein $\tilde{U}(x)=-\alpha$ for $x<-\alpha$, $\tilde{U}(x)=x$ for $|x|<\alpha$, and $\tilde{U}(x)=\alpha$ if $x>\alpha$ where $\alpha$ is a positive and real number and x is a real number.

21. A system for adjusting a set of one or more receiver parameters, comprising:

a controller configured to determine whether to adjust the set of one or more receiver parameters;

a parameter generator configured to generate, in an event it is determined to adjust the set of one or more receiver parameters, a new set of values for the set of one or more receiver parameters using a cost function, wherein the cost function does not assume a noise signal in a receive signal to have a particular statistical distribution; and an interface configured to change, in an event it is determined to adjust the set of one or more receiver parameters, the set of one or more receiver parameters to have the new set of values, wherein:

the set of one or more receiver parameters includes a set of one or more parameters (w) associated with an equalizer; and the cost function includes $$\frac{\partial \mathcal{F}(b^*, \hat{b}, x, p)}{w_k} = 2 \cdot s_{(\hat{b},i)} \cdot \left(z_{(\hat{b},i)} - l_{(\hat{b},i)}\right) \cdot \sum_{j=1}^{P} g_{(\hat{b},j)} \cdot x_{(i-j-k+n_g+n_w)} -$$
$$2 \cdot s_{(b^*,i)} \cdot (z_{(b^*,i)} - l_{(b^*,i)}) \cdot \sum_{j=1}^{P} g_{(b^*,j)} x_{(i-j-k+n_g+n_w)}.$$

22. The system of claim 21, wherein the parameter generator is further configured to determine the cost function using a function $\tilde{U}(x)$, wherein $\tilde{U}(x)=-\alpha$ for $x<-\alpha$, $\tilde{U}(x)=x$ for $|x|<\alpha$, and $\tilde{U}(x)=\alpha$ if $x>\alpha$ where $\alpha$ is a positive and real number and x is a real number.

* * * * *

UNITED STATES PATENT AND TRADEMARK OFFICE
CERTIFICATE OF CORRECTION

| | | |
|---|---|---|
| PATENT NO. | : 7,872,978 B1 | |
| APPLICATION NO. | : 12/148503 | |
| DATED | : January 18, 2011 | |
| INVENTOR(S) | : Marrow et al. | |

It is certified that error appears in the above-identified patent and that said Letters Patent is hereby corrected as shown below:

Claims

Column 10, Claim 1, Line 3: delete " $\frac{\partial \mathcal{J}(\mathbf{b}^*,\hat{\mathbf{b}},\mathbf{x},\mathbf{p})}{s_{(\hat{\mathbf{b}},j)}} = (z_{(\hat{\mathbf{b}},i)} - l_{(\hat{\mathbf{b}},i)})^2$ or" and insert -- $\frac{\partial \mathcal{J}(\mathbf{b}^*,\hat{\mathbf{b}},\mathbf{x},\mathbf{p})}{s_{(\hat{\mathbf{b}},i)}} = (z_{(\hat{\mathbf{b}},i)} - l_{(\hat{\mathbf{b}},i)})^2$ or (2)--

Column 10, Claim 11, Line 42: delete "substantially"

Column 10, Claim 12, Line 57: replace the number "1" with the letter --l--

Column 10, Claim 12, Line 63: delete " $\frac{\partial \mathcal{J}(\mathbf{b}^*,\hat{\mathbf{b}},\mathbf{x},\mathbf{p})}{l_{(\hat{\mathbf{b}},j)}} = -2 \cdot s_{(\hat{\mathbf{b}},i)} \cdot (z_{(\hat{\mathbf{b}},i)} - l_{(\hat{\mathbf{b}},i)})$ or" and insert -- $\frac{\partial \mathcal{J}(\mathbf{b}^*,\hat{\mathbf{b}},\mathbf{x},\mathbf{p})}{l_{(\hat{\mathbf{b}},i)}} = -2 \cdot s_{(\hat{\mathbf{b}},i)} \cdot (z_{(\hat{\mathbf{b}},i)} - l_{(\hat{\mathbf{b}},i)})$ or (2)--

Column 11, Claim 13, Line 21: delete "(g)," and insert --(g)--

Column 11, Claim 13, Line 30: delete "or" and insert --or (2)--

Signed and Sealed this
Twenty-fifth Day of September, 2012

David J. Kappos
*Director of the United States Patent and Trademark Office*

CERTIFICATE OF CORRECTION (continued)
U.S. Pat. No. 7,872,978 B1

Column 11, Claim 14, Line 55: delete "
$$\frac{\partial \ell (\mathbf{b}^*, \hat{\mathbf{b}}, \mathbf{x}, \mathbf{p})}{w_k}$$
$$= 2 \cdot s_{(\hat{\mathbf{b}}, i)} \cdot (z_{(\hat{\mathbf{b}}, i)} - l_{(\hat{\mathbf{b}}, i)}) \cdot \sum_{j=1}^{P} g_{(\hat{\mathbf{b}}, j)} x_{(i-j-k+n_g+n_w)}$$
$$- 2 \cdot s_{(\mathbf{b}^*, i)} \cdot (z_{(\mathbf{b}^*, i)} - l_{(\mathbf{b}^*, i)}) \cdot \sum_{j=1}^{P} g_{(\mathbf{b}^*, j)} x_{(i-j-k+n_g+n_w)}$$
" and insert $$\frac{\partial \ell (\mathbf{b}^*, \hat{\mathbf{b}}, \mathbf{x}, \mathbf{p})}{w_k} = 2 \cdot s_{(\hat{\mathbf{b}}, i)} \cdot (z_{(\hat{\mathbf{b}}, i)} - l_{(\hat{\mathbf{b}}, i)}) \cdot \sum_{j=1}^{P} g_{(\hat{\mathbf{b}}, j)} x_{(i-j-k+n_g+n_w)}$$
$$- 2 \cdot s_{(\mathbf{b}^*, i)} \cdot (z_{(\mathbf{b}^*, i)} - l_{(\mathbf{b}^*, i)}) \cdot \sum_{j=1}^{P} g_{(\mathbf{b}^*, j)} x_{(i-j-k+n_g+n_w)}$$
--

Column 12, Claim 15, Line 11: delete "one of: $\frac{\partial \ell (\mathbf{b}^*, \hat{\mathbf{b}}, \mathbf{x}, \mathbf{p})}{s_{(\hat{\mathbf{b}}, i)}} = (z_{(\hat{\mathbf{b}}, i)} - l_{(\hat{\mathbf{b}}, i)})^2$ or" and insert --one of: (1) $\frac{\partial \ell (\mathbf{b}^*, \hat{\mathbf{b}}, \mathbf{x}, \mathbf{p})}{s_{(\hat{\mathbf{b}}, i)}} = (z_{(\hat{\mathbf{b}}, i)} - l_{(\hat{\mathbf{b}}, i)})^2$ or (2) --

Column 12, Claim 17, Line 47: delete " $\frac{\partial \ell (\mathbf{b}^*, \hat{\mathbf{b}}, \mathbf{x}, \mathbf{p})}{l_{(\hat{\mathbf{b}}, i)}} = -2 \cdot s_{(\hat{\mathbf{b}}, i)} \cdot (z_{(\hat{\mathbf{b}}, i)} - l_{(\hat{\mathbf{b}}, i)})$ or"
and insert -- $\frac{\partial \ell (\mathbf{b}^*, \hat{\mathbf{b}}, \mathbf{x}, \mathbf{p})}{l_{(\hat{\mathbf{b}}, i)}} = -2 \cdot s_{(\hat{\mathbf{b}}, i)} \cdot (z_{(\hat{\mathbf{b}}, i)} - l_{(\hat{\mathbf{b}}, i)})$ or (2) --

Column 12, Claim 18, Line 59: delete " $\tilde{U}(x) = -\alpha,$ for $x < -\alpha,$ " and insert -- $\tilde{U}(x) = -\alpha$ for $x < -\alpha,$ --

CERTIFICATE OF CORRECTION (continued)
U.S. Pat. No. 7,872,978 B1

Column 13, Claim 19, Line 20: delete

"or $$\frac{\partial \ell(\mathbf{b}^*,\hat{\mathbf{b}},\mathbf{x},\mathbf{p})}{g_{(\mathbf{b}^*,i)}} = -2 \cdot s_{(\mathbf{b}^*,i)} \cdot (z_{(\mathbf{b}^*,i)} - l_{(\mathbf{b}^*,i)}) \cdot y_{(i+n_g-j)}$$" and insert --or (2) $$\frac{\partial \ell(\mathbf{b}^*,\hat{\mathbf{b}},\mathbf{x},\mathbf{p})}{g_{(\mathbf{b}^*,j)}} = -2 \cdot s_{(\mathbf{b}^*,i)} \cdot (z_{(\mathbf{b}^*,i)} - l_{(\mathbf{b}^*,i)}) \cdot y_{(i+n_g-j)}$$--